United States Patent [19]
Rosenthal

[11] 3,815,709
[45] June 11, 1974

[54] LUBRICATING DEVICE
[75] Inventor: Eric Rosenthal, Hochdahl, Germany
[73] Assignee: G. Schwartz & Co., Dusseldorf, Germany
[22] Filed: Mar. 22, 1973
[21] Appl. No.: 343,883

Related U.S. Application Data
[63] Continuation of Ser. No. 170,830, Aug. 11, 1971, abandoned.

[30] Foreign Application Priority Data
May 12, 1971 Germany.............................. 2123557

[52] U.S. Cl.................... 184/6.28, 184/31, 418/189
[51] Int. Cl............................................... F16n 7/40
[58] Field of Search ........... 418/189, 206; 184/6.12, 184/6.28, 26, 31; 74/467, 468

[56] References Cited
UNITED STATES PATENTS
| | | | |
|---|---|---|---|
| 1,357,301 | 11/1920 | Reaugh............................ | 74/467 X |
| 2,531,861 | 11/1950 | Schmitt............................ | 184/31 X |
| 2,907,595 | 10/1959 | Benson et al. .................... | 277/53 X |
| 2,910,142 | 10/1959 | Almen .............................. | 184/6.12 |
| 3,123,012 | 3/1964 | Gilreath.......................... | 418/189 X |
| 3,139,834 | 7/1964 | Blomgren et al. .............. | 418/189 X |
| 3,326,560 | 6/1967 | Trbovich......................... | 277/205 X |

Primary Examiner—Manuel A. Antonakas
Attorney, Agent, or Firm—Walter Becker

[57] ABSTRACT

A lubricating device, especially for rolling mills, with a fluid pump including a gear ring and pinion means in mesh therewith while a radially divisible hub is connected to the gear ring which latter at the tooth spaces thereof has radially extending feeding bores leading into tap bores, the pinion means being journalled in radially divisible housing means, the hub and the housing means being movable relative to each other.

8 Claims, 3 Drawing Figures

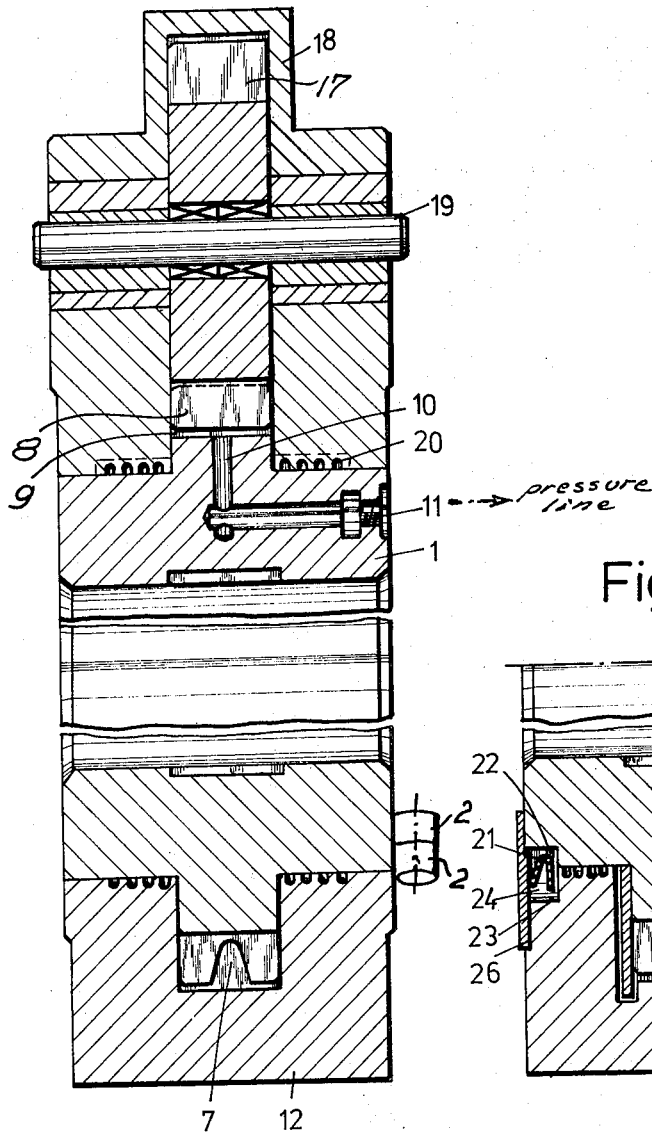
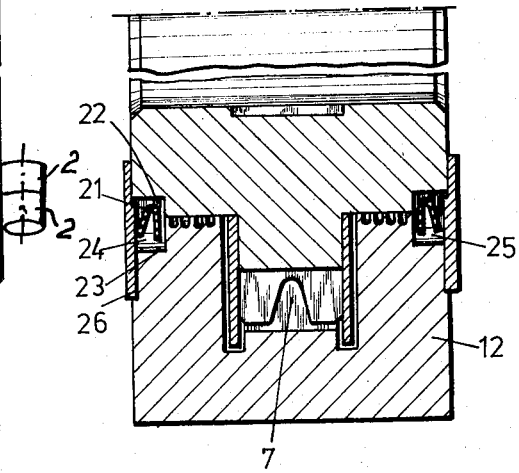

LUBRICATING DEVICE

This is a continuation of a copending application Ser. No. 170,830 — Erich Rosenthal filed Aug. 11, 1971, and now abandoned.

The present invention relates to a lubricating device for lubricating roll spindles of rolling mills or the like with a pump comprising a gear ring and at least one pinion while the spindle has connected thereto a radially divisible hub with a gear ring. In the tooth spaces of the gear ring there are provided radial feeding bores leading into the tap bores of the hub while the pinion meshing with the gear ring is journalled in a lid or cover which is rotatable relative to the hub and is radially divisible.

Lubricating devices of the above mentioned type are known according to which the hub has a U-shaped cross section and forms an annular chamber for the lubricant which chamber is open toward the cicumference. Also the two sections of the gear ring are connected to the bottom of the chamber while the pinion meshes with the gear ring. During the practical operation of this known lubricating device it has been found difficult sufficiently to seal the gap between the hub and the cover because this gap is located in the region where the centrifugal force of the lubricant carried away by the gear ring in the hub obtaines its greatest value. A further disadvantage of this known lubricating device consists in that feeding bores are provided in all tooth spaces of the gear ring so that a continuous intensive fulling of the lubricant occurs whereby the inner pressure in the chamber in front of the gap between the hub and the cover increases further so that the lubricant may even lose a part of its lubricating ability.

It is, therefore, an object of the present invention to provide a lubricating device which will make possible a proper seal of the gap between the hub and the cover even after a longer period of operation.

This object and other objects and advantages of the invention will appear more clearly from the following specification in connection with the accompanying drawing, in which:

FIG. 2 is a section taken along the line II—II of FIG. 1, but on a larger scale than that of FIG. 1.

FIG. 3 shows a cutout of FIG. 2 with a sealing ring interposed between the hub and the cover.

Figure 1:
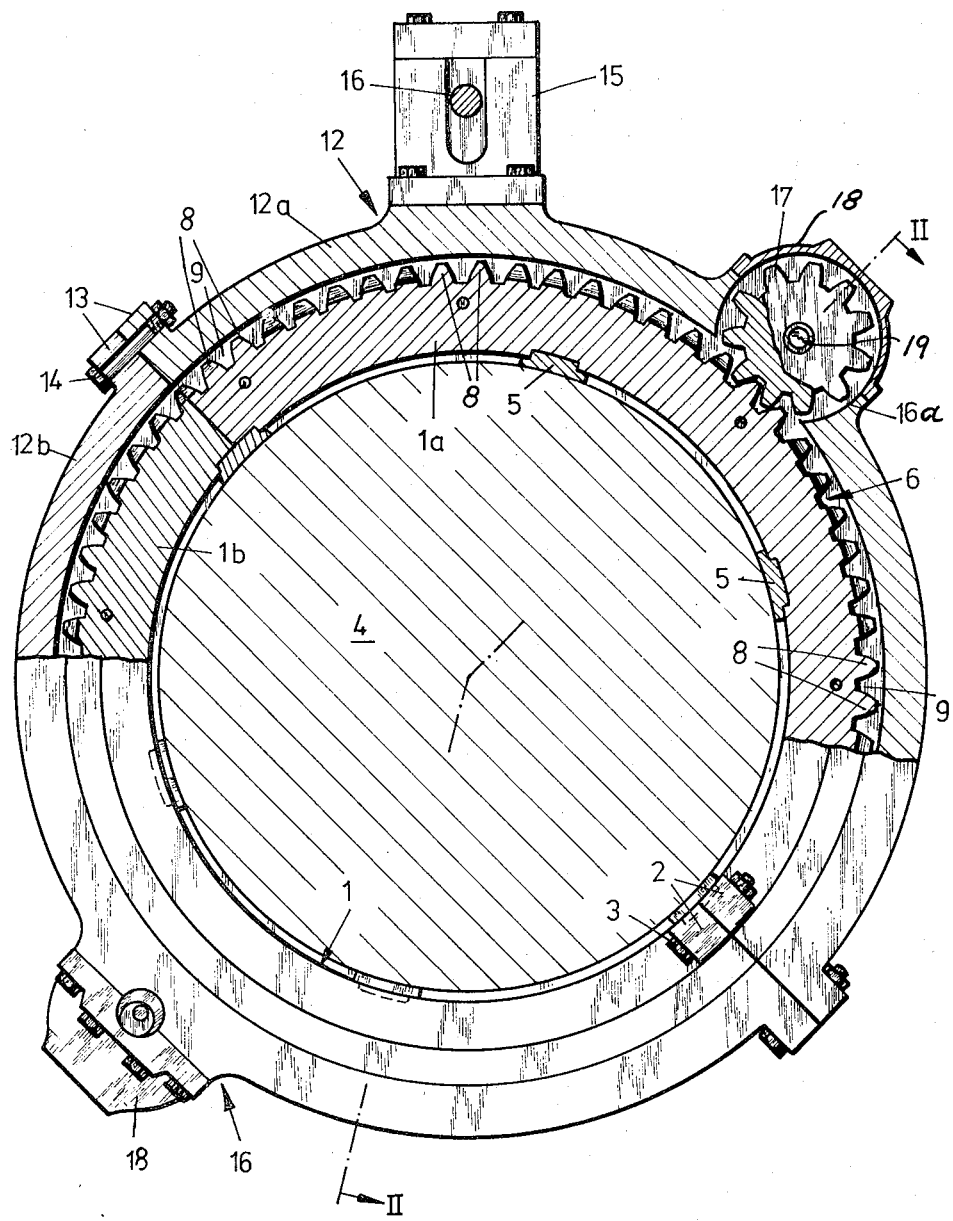
FIG. 1 illustrates partly in section and partly in view a lubricating device according to the present invention.

The present invention starts with a heretofore known lubricating device for roll spindles of rolling mills or the like with a pump comprising a gear ring and at least one pinion while a radially divisible hub on the spindle is connected to the gear ring which latter in its tooth spaces has radially extending conveying bores leading into the tap bores of the hub, the pinion meshing with the gear ring being journalled in a radially divisible cover which is rotatable relative to the hub.

The lubricating device according to the present invention is characterized primarily in that the cover has a U-shaped cross section and forms a chamber extending over the gear ring, and is furthermore characterized in that the teeth of the non-feeding tooth spaces are provided with radially directed outlet openings.

The lubricating device according to the invention has the advantage that the sealing gap between the hub and the cover has been displaced from the range of the highest circumferential speed of the gear ring and thereby from the range of the highest centrifugal force of the lubricant to an area inwardly located in a region of lower circumferential speed of the hub. This brings about a considerable increase in the length of the sealing gap between the hub and the cover so that this feature alone results in a considerable reduction of the lubricating pressure in the sealing gap. This effect is surprisingly further improved due to the additional feature of the invention, namely the arrangement of the radial outlet openings in the teeth of the non-feeding tooth spaces, because in this way the lubricant pressure in the chamber is considerably reduced. A favorable side effect consists in that the lubricant will no longer be fulled to such an extent that it can lose part of its lubricating ability.

According to a further development of the invention for additionally improving the seal between the contacting surfaces of hub and cover, there may be provided a labyrinth seal, for instance, in the form of grooves in the cover. With the design of the device according to the invention it is also possible to provide a sealing ring of V-shaped cross-section at the outer end of the sealing gap in an annular chamber formed by folds in the hub and in the cover, the annular chamber being closed toward the outside by discs connected to the cover. The sealing ring of V-shaped cross-section is so arranged in the annular chamber that the open side of its profile faces in a direction opposite to the direction of flow of the outflowing lubricant. With this design an absolutely tight seal will be assured between the hub and the cover, even after a long period of operation.

Referring now to the drawings in detail, the arrangement shown therein comprises a hub 1 composed of two sections 1a and 1b. This hub is by means of lateral flanges 2 and bolts 3 connected to form a ring surrounding a roll spindle 4. The tensioning of the annular hub 1 on the roll spindle 4 is effected by means of wedges 5 of synthetic material, for instance synthetic rubber known under the trade name "Buna" or of steel. The outer circumference of hub 1 at the central portion thereof is provided with a gear ring 6 the teeth of which are partly provided with outflow openings 7 and partly have no such openings so as to form full conveying teeth 8. Each two full conveying teeth 8 form therebetween a conveying teeth space 9 from which a conveying or feeding bore 10 extends radially into the gear ring 6 and axially out of the hub 1. The mouth of the conveying bore 10 is provided with a thread 11 so that a non-illustrated pressure line may be connected thereto by interposing a check valve.

Placed over the hub 1 is a cover 12 having a U-shaped cross section and being composed of two sections 12a, 12b which at flanges 3 are connected to each other by bolts 14. The cover 12 is rotatable relative to hub 1 and is held to a radially protruding support 15 by means of a bolt 16 while the hub 1 rotates with spindle 4.

Provided in cover 12 are two diametrically oppositely located housings 16a into which are respectively inserted pinions 17. The housing 16a are closed by covers 18 so that a shaft 19 having the pinions 17 journalled thereon can be clamped in a pressure-tight manner between the two parts. The feeding of the lubricant is effected through one of the two housing covers 18.

In the sliding surface of cover 12 toward hub 1 there are provided grooves 20 forming a labyrinth seal. When the lubricating pressure is extremely high, the seal between hub 1 and the cover 12 can further be improved by providing sealing rings 21 in conformity with the arrangement shown in FIG. 3, the rings 21 being inserted into annular chambers 24, 25 formed by grooves 22, 23. The annular chambers 24, 25 are sealed toward the outside by discs 26 connected to the cover 12. The rings 21 have a V-shaped profile and are clamped onto the hub 1 in such a manner that their open profile points into a direction opposite to the direction of flow of the lubricant escaping through the gap. In this way the sealing rings 21 are with one sealing rib pressed against disc 26 while they rotate together with hub 1.

The pressure and the quantity of the supplied lubricant are adjustable by controlling the speed of rotation of the roll spindle 4 on which hub 1 is connected to the gear ring 6.

The number of the feeding bores 10 may be selected in conformity with the individual requirements.

It is, of course, to be understood that the present invention is, by no means, limited to the particular showing in the drawings but also comprises any modifications within the scope of the appended claims.

What I claim is:

1. In a lubricant pumping device, a ring gear adapted to be mounted on a rotary spindle to be driven in rotation thereby and having external teeth and end faces, a nonrotatable housing adapted to receive lubricant to be pumped and having a peripheral wall coaxially surrounding said ring gear and radial end walls extending inwardly along said ring gear end faces to beyond the bottoms of the tooth spaces in said ring gear, cavity means formed in said peripheral wall of said housing and open toward the periphery of said ring gear, pinion means rotatable in said cavity means and meshing with said ring gear, conduit means formed in said ring gear and each leading from the bottom of one of circumferentially spaced ones of the tooth spaces of the ring gear to an axial end region of said ring gear in a region radially inward from the adjacent end wall of said housing, and passage means formed in said ring gear and effecting fluid communication between each of the others of the tooth spaces of said ring gear and at least one of the said other tooth spaces adjacent thereto whereby the teeth immediately adjacent each of said spaced ones of said tooth spaces forming pumping teeth and the others of the teeth of said ring gear forming nonpumping teeth, and whereby lubricant is pumped only when a tooth of the pinion means engages between a respective pair of pumping teeth and enters one of said spaced ones of the said tooth spaces of said ring gear, said ring gear having cylindrical axial hub portions extending from opposite sides thereof and each hub portion having an axially outwardly facing end surface, said hub portions being disposed radially inwardly from the bottoms of the tooth spaces of said ring gear, said end walls of said housing having apertures closely and rotatably engaging said hub portions of said ring gear and means sealing between said apertures and said hub portions, said passage means leading through at least one said hub portion to the said end surface thereof.

2. In a lubricant pumping device, a ring gear adapted to be mounted on a rotary spindle to be driven in rotation thereby and having external teeth and end faces, a nonrotatable housing adapted to receive lubricant to be pumped and having a peripheral wall coaxially surrounding said ring gear and radial end walls extending inwardly along said ring gear end faces to beyond the bottoms of the tooth spaces in said ring gear, cavity means formed in said peripheral wall of said housing and open toward the periphery of said ring gear, pinion means rotatable in said cavity means and meshing with said ring gear, conduit means formed in said ring gear and each leading from the bottom of one of circumferentially spaced ones of the tooth spaces of the ring gear to an axial end region of said ring gear in a region radially inward from the adjacent end wall of said housing, and passage means formed in said ring gear and effecting fluid communication between each of the others of the tooth spaces of said ring gear and at least one of the said other tooth spaces adjacent thereto whereby the teeth immediately adjacent each of said spaced ones of said tooth spaces forming pumping teeth and the others of the teeth of said ring gear forming nonpumping teeth, and whereby lubricant is pumped only when a tooth of the pinion means engages between a respective pair of pumping teeth and enters one of said spaced ones of the said tooth spaces of said ring gear, said ring gear having cylindrical axial hub portions extending from opposite sides thereof and each hub portion having an axially outwardly facing end surface, said hub portions being disposed radially inwardly from the bottoms of the tooth spaces of said ring gear, said end walls of said housing having apertures closely and rotatably engaging said hub portions of said ring gear and means sealing between said apertures and said hub portions, said passage means leading through at least one said hub portion to the said end surface thereof, said means sealing said housing to said hub portions comprising labyrinth seal means in the form of parallel annular groove means formed in one of the said apertures in said housing and said hub portions and open toward the other thereof.

3. In a lubricant pumping device, a ring gear adapted to be mounted on a rotary spindle to be driven in rotation thereby and having external teeth and end faces, a nonrotatable housing adapted to receive lubricant to be pumped and having a peripheral wall coaxially surrounding said ring gear and radial end walls extending inwardly along said ring gear end faces to beyond the bottoms of the tooth spaces in said ring gear, cavity means formed in said peripheral wall of said housing and open toward the periphery of said ring gear, pinion means rotatable in said cavity means and meshing with said ring gear, conduit means formed in said ring gear and each leading from the bottom of one of circumferentially spaced ones of the tooth spaces of the ring gear to an axial end region of said ring gear in a region radially inward from the adjacent end wall of said housing, and passage means formed in said ring gear and effecting fluid communication between each of the others of the tooth spaces of said ring gear and at least one of the said other tooth spaces adjacent thereto whereby the teeth immediately adjacent each of said spaced ones of said tooth spaces forming pumping teeth and the others of the teeth of said ring gear forming nonpumping teeth, and whereby lubricant is pumped only when a tooth of the pinion means engages between a respective pair of pumping teeth and enters one of said spaced ones of the said tooth spaces of said ring gear, said passage means comprising radial notches formed in at least those nonpumping teeth immediately adjacent said pumping teeth and at least alternate ones of the others of said nonpumping teeth, each said notch extending from the radially outer end of the respective tooth to near the radially inner end thereof.

4. In a lubricant pumping device, a ring gear adapted to be mounted on a rotary spindle to be driven in rotation thereby and having external teeth and end faces, a nonrotatable housing adapted to receive lubricant to be pumped and having a peripheral wall coaxially surrounding said ring gear and radial end walls extending inwardly along said ring gear end faces to beyond the bottoms of the tooth spaces in said ring gear, cavity means formed in said peripheral wall of said housing and open toward the periphery of said ring gear, pinion means rotatable in said cavity means and meshing with said ring gear, conduit means formed in said ring gear and each leading from the bottom of one of circumferentially spaced ones of the tooth spaces of the ring gear to an axial end region of said ring gear in a region radially inward from the adjacent end wall of said housing, and passage means formed in said ring gear and effecting fluid communication between each of the others of the tooth spaces of said ring gear and at least one of the said other tooth spaces adjacent thereto whereby the teeth immediately adjacent each of said spaced ones of said tooth spaces forming the pumping teeth and the others of the teeth of said ring gear forming nonpumping teeth, and whereby lubricant is pumped only when a tooth of the pinion means engages between a respective pair of pumping teeth and enters one of said spaced ones of the said tooth spaces of said ring gear, said passage means comprising radial notches formed in all of said nonpumping teeth, at least those nonpumping teeth immediately adjacent said pumping teeth and at least alternate ones of the others of said nonpumping teeth, each said notch extending from the radially outer end of the respective tooth to near the radially inner end thereof.

5. In a lubricant pumping device, a ring gear adapted to be mounted on a rotary spindle to be driven in rotation thereby and having external teeth and end faces, a nonrotatable housing adapted to receive lubricant to be pumped and having a peripheral wall coaxially surrounding said ring gear and radial end walls extending inwardly along said ring gear end faces to beyond the bottoms of the tooth spaces in said ring gear, cavity means formed in said peripheral wall of said housing and open toward the periphery of said ring gear, pinion means rotatable in said cavity means and meshing with said ring gear, conduit means formed in said ring gear and each leading from the bottom of one of circumferentially spaced ones of the tooth spaces of the ring gear to an axial end region of said ring gear in a region radially inward from the adjacent end wall of said housing, passage means formed in said ring gear and effecting fluid communication between each of the others of the tooth spaces of said ring gear and at least one of the said other tooth spaces adjacent thereto whereby the teeth immediately adjacent each of said spaced ones of said tooth spaces forming pumping teeth and the others of the teeth of said ring gear forming nonpumping teeth, and whereby lubricant is pumped only when a tooth of the pinion means engages between a respective pair of pumping teeth and enters one of said spaced ones of the said tooth spaces of said ring gear, an axial annular recess formed in at least one of each hub portion and the respective end wall of said housing at the juncture thereof, and V-shaped sealing ring means confined in each recess and sealing between each hub portion and the respective housing end wall.

6. In combination; a rotary machine spindle, a split external ring gear clamped around said spindle to be driven in rotation thereby, said ring gear having hubs projecting from opposite axial sides thereof and each hub having an end face, a split housing U-shaped in cross section clamped around said ring gear and sealingly engaging said hubs and the opposite axial sides of said ring gear, means for holding said housing against rotation during rotation of said ring gear and spindle, at least one cavity in said housing opening toward said ring gear and a pinion therein meshing with said ring gear, passage means in said ring gear each leading from the bottom of a respective one of spaced tooth spaces of said ring gear through said ring gear and a hub thereof to the end face of the respective hub, and passage means formed in said ring gear and effecting fluid communication between adjacent ones of the others of the tooth spaces of said ring gear.

7. The combination according to claim 6 in which said passage means comprises radial notches formed in at least the teeth of the ring gear which are next adjacent the teeth immediately adjacent said spaced ones of said tooth spaces and in at least alternate ones of the others of the teeth of said ring gear.

8. The combination according to claim 6 in which said passage means comprises radial notches formed in all of the teeth of said ring gear except those teeth immediately adjacent said spaced ones of said tooth spaces.

* * * * *